(No Model.) 4 Sheets—Sheet 1.

A. MECHWART.
ROTARY PLOW.

No. 534,403. Patented Feb. 19, 1895.

Fig. 1.

WITNESSES:

INVENTOR
Andreas Mechwart
BY
ATTORNEY

(No Model.) 4 Sheets—Sheet 3.

A. MECHWART.
ROTARY PLOW.

No. 534,403. Patented Feb. 19, 1895.

WITNESSES

INVENTOR
Andreas Mechwart
BY
ATTORNEY (No Model.) 4 Sheets—Sheet 4.

A. MECHWART.
ROTARY PLOW.

No. 534,403. Patented Feb. 19, 1895.

WITNESSES:

INVENTOR
Andreas Mechwart
BY
ATTORNEY

UNITED STATES PATENT OFFICE.

ANDREAS MECHWART, OF BUDA-PESTH, AUSTRIA-HUNGARY.

ROTARY PLOW.

SPECIFICATION forming part of Letters Patent No. 534,403, dated February 19, 1895.

Application filed May 19, 1894. Serial No. 511,824. (No model.)

*To all whom it may concern:*

Be it known that I, ANDREAS MECHWART, a subject of the Emperor of Austria-Hungary, residing at Buda-Pesth, Austria-Hungary, have invented new and useful Improvements in Rotary Plows, of which the following is a specification.

My invention has for its object to provide a rotary plow adapted more especially to be hauled by a traction locomotive on which it is mounted, and having a simple and durable construction and efficient operation.

My improved plow is designed to cut compact molds from the ground surface and deposit the molds regularly in inverted condition behind the cutting device which is a drum carrying knife-like shares peculiarly formed and arranged. The machine therefore is to be clearly distinguished from that class of so-called rotary plows which have a rotary drum carrying series of narrow spades or teeth which simply loosen the ground and scatter it upward and throw it about unevenly, like harrows or cultivators.

I have for a long time made a special study of rotary plowing machines, and after making many practical experiments in the field, I find that the best results are obtained by or from a machine combining the following features of construction and operation.

The plow should cut compact molds from the ground surface and deposit these molds regularly to the rear and in inverted condition, and as soon as possible after lifting the molds from the ground to avoid loss of power and hinderance to the cutting such as would be caused by carrying the cut molds or earth upward and over the top of the share drum.

The share drum should be arranged so that its cutters act shearingly and lift the molds and discharge them rearward and inverted, and at the same time the shares should work in the soil continuously, that is to say, one share should begin to cut a mold before the preceding share has quite finished cutting its mold, whereby the power rotating the drum will be applied uniformly at all points of its rotation, and shocks to the power transmitting gearing will be avoided. The share drum should also cut downward and rearward or should rotate in the same direction as the running wheels of the locomotive or traction engine, in order to have the cutting or plowing by the drum assist the forward movement of the machine by having a pushing effect, instead of dragging backward and hindering the forward movement as would be done with a share drum cutting the ground upwardly while rotating in the reverse direction. The share drum should also be capable of rising automatically or without attention of the plowman should the cutters or shares strike an obstruction, and the drum, while having this vertical self-adjustment, should be rotated by mechanism or gearing specially arranged to prevent the draft or pull of the gearing from raising the plow in or from the ground, and provision should also be made for raising the drum above the ground surface by hand power and holding or locking it thus raised while the machine is standing still or while it is traveling on the road to and from the place of use.

The plow should cut molds to any desired depth uniformly and also for an unbroken or continuous width sufficient to cover the track of both running wheels of the locomotive traction engine, or for a width covering at least the track of one running wheel, to allow plowing at either side, or at one side, of an already plowed portion of the ground while the traction wheels run on solid unplowed ground and do not spoil the work already done. The uniform depth to which the share drum works in the ground should also be automatically controlled from the ground surface and at a place as near as may be to the place of cutting by the drum and without requiring attention of the plowman.

In constructing a single machine capable of working satisfactorily in all respects above named, and in view of the large amount of inventive work which has heretofore been done in rotary plows, I have almost necessarily availed myself of certain general features of construction of prior machines of this character. I have, however, devised many inherently new features and have made novel combinations of old features, both with or in themselves and in connection with the new constructions and modes of operation, all as hereinafter more fully explained.

I will now proceed to describe a rotary plow of preferred construction, or one combining the greatest number of desirable old and new features in the most advantageous manner, to produce the best plowing with the least expenditure of power and minimum labor of attendants.

Reference is to be had to the accompanying drawings, forming part of this specification, and in which similar numerals indicate corresponding parts in the different views.

A locomotive or traction engine or motor of any suitable character, and using steam, gas, oil, compressed air or electricity, as a means of generating power, may be used. The drawings show an ordinary steam locomotive 1, having a cranked shaft 2, operated from the steam piston, and rotating a parallel shaft 3 by any suitable gearing. On the shaft 3 is a chain wheel 4, over which passes a driving chain 5, which engages another chain wheel on the axle 6, while at the other side of the machine the shaft 3 carries a gear wheel which meshes with intermediate gearing engaging a gear wheel on the axle, which thus is rotated to advance the machine by both driving chain and direct toothed-wheel gearing. The forward part of the locomotive is suitably supported by smaller front wheels with the axle of which is connected chain and worm steering gearing operative by a hand wheel in reach of the plowman or attendant at the rear of the machine.

The main axle 6 carries a sprocket wheel 6', over which passes a driving chain 8 to another sprocket wheel 9 on a transverse driving shaft 10, which is journaled in boxes on a vibratory frame 15 hung preferably on the main axle 6, on which it may oscillate vertically. The share drum 16 is preferably supported loosely on a non-rotating shaft 14, which is held at the rear end of the vibratory frame 15. The drum is composed of a series of knife-like shares which are fastened to the extremity of a series of spider frames 17. The hubs 18 of the two inner or intermediate spiders 17 are placed directly and loosely on the shaft 14, but the two hubs 18' of the outer or end spiders are fastened to the lengthened hubs of gear wheels 13, 13, which are placed loosely one upon each end of the shaft 14. By rotating the wheels 13, the share drum will be rotated in like direction. I may rotate the wheels 13 and the drum from the shaft 10 by sprocket and chain wheel gearing, but I prefer to employ at each side of the machine an intermediate gear wheel 12, which engages the adjacent wheel 13, and is engaged by a toothed-wheel 11 fast on the shaft 10.

Suspension frames substantially like the frame 15 have before been used in rotary plows to support a share drum or toothed drum for working the soil. In some instances this frame giving vibratory support to the drum is inclined rearward from the pivot shaft as in my plow, and in that shown in United States Patent No. 100,183. The suspension frame carrying the cutting drum has also been inclined forward from the pivot shaft, as in United States Patent No. 243,843. In the first named class to which my plow belongs, there is a tendency, when the share drum rotates in like direction with the running wheels, to lift the drum in or entirely from the ground by the pull or draft of the driving gearing which rotates the drum, while in the other case, or with the forwardly inclined suspension frame, the driving gearing has a tendency to force the drum downward farther into the ground.

In my plow, arranged as shown in the drawings, the wheel 6' on the axle 6 is to be considered the driving wheel with respect to the share drum, and I have purposely given this wheel 6' the same rotation direction as the share drum, in order to permit the plow to rise easily with its suspension frame and without danger of overstraining or breaking the power transmitting gearing, should the drum meet too great an obstruction in the ground. It will be understood, however, that with the driving mechanism of the prime motor otherwise arranged, the shaft 10 may be considered the driving shaft or the direct agent in rotating the share drum, and the suspension frame 15 may also be pivoted or hung directly on this shaft 10, instead of on the motor axle 6.

The arrangement of the share drum in a vibratory suspension frame behind the running or traction wheels, and to rotate in like direction with said wheels in order to cut downward from the ground surface, and thereby assist the forward movement of the plow apparatus and most easily and directly deposit the molds, is most desirable. The suspension frame and share drum should at the same time be capable of rising automatically should the drum meet too great an obstruction. It is necessary, therefore, that some means be provided to fully secure these adjustments and advantages while assuring that the share drum shall always work to any desired uniform depth, or in other words, to secure the advantages while preventing the share drum from being lifted from proper working position when it does not strike an obstruction in the ground.

In my early experiments, I connected sprocket wheels on the share drum by open chain belts with larger chain wheels on the running wheels 7 of the motor, and substantially as shown in the above named United States Patent No. 100,183, and before I had knowledge of said patent. In this case the motor axle and running wheels were the driving means for rotating the share drum in like direction with the running wheels, but the driving means had a slower rotative speed than the share drum. In attempting to use this construction, I soon found that the draft of the drive chain would at times raise the suspension frame and lift the share drum in or from the ground and make good plowing impossible, and if I attempted to lock the suspension frame to hold the share drum down to proper working depth, this would prevent automatic rising of the frame with the drum, should the latter strike an obstruction in the ground. To overcome this difficulty I further studied and experimented, and discovered that if the share drum were operated by or from a driving shaft or means which rotated in the same direction but faster than the drum, this draft tendency to lift the suspension frame and drum would be overcome to necessary extent and the drum would be continuously rotated and would not rise from its work, unless it met a serious obstruction in the ground, and then it would rise automatically and avoid injury to itself or its driving mechanism. I therefore consider that these different relative rotative speeds in the same direction, of the share drum and its driving shaft or means, is an important feature of my invention and embodies a correct principle of operation.

In the construction shown in the drawings, the driving wheel 6' is rotated by or from the motor shafts 2, 3, and at a speed faster than that of the share drum, and the intermediate shaft 10 on the suspension frame is rotated from the wheel 6' at a speed faster than said wheel and considerably faster than the share drum.

I will next describe certain peculiar features of construction of the share drum which may appear to differ but slightly from prior constructions, but operatively effect very different and much improved results. It is desirable that the knife-like shares of the drum shall cut compact molds downward from the ground for the entire width of the drum and then lift these molds and immediately deposit them regularly to the rear in inverted condition.

A drum having shares whose cutting edges are parallel with the drum shaft would cut molds downward from comparatively dry soil and deposit the molds rearward on the ground immediately behind the place from which they were cut, but in order to space such parallel edged shares a sufficient distance apart circumferentially around the drum to deposit the molds without having one falling mold interfere with the cutting of the next mold by the following share, it is quite necessary to separate the shares circumferentially in such manner as will not permit one share to begin cutting its mold before the preceding share had stopped cutting. Hence the share drum would not cut continuously for its entire width or circumference and the shock to the drum rotating mechanism would be very great as each share began its cut. On the other hand, were the cutting edges of the shares inclined at a considerable or too great angle from the axis of the drum, the shock-preventing continuous cut of the shares from end to end of the drum is obtained, but the shares will not lift the molds bodily and deposit them regularly to the rear in inverted condition.

During my extended practical experiments, I have produced a share drum which avoids both the above undesirable extremes in operative results. Because of the different nature of soils in different localities, I am not able to state the precise angle which the cutting edges of the drum shares should have to obtain the best or most easy shearing action while cutting, but this angle should not exceed approximately thirty degrees from the axial line or shaft of the drum. In other words, I have discovered that when the angle of inclination of the cutting edges of the drum shares exceeds an inclination approximating thirty degrees, the shares will simply cut through the ground and the cut molds will slip from and over the shares and will be left the same side up on the ground but thrown endwise more or less relatively to the place whence they were cut. It will therefore be understood that where in this specification, and with reference to the cutting edges of the shares, I mention an angle not exceeding thirty degrees, I mean any angle less than a maximum approximate of thirty degrees and which will assure easy cutting of the molds by shearing action of the shares and permit the shares to lift the cut molds bodily and deposit them rearward in inverted condition. I am not aware of any prior construction of rotary plow whose share drum operates with these important results.

Figure 3:
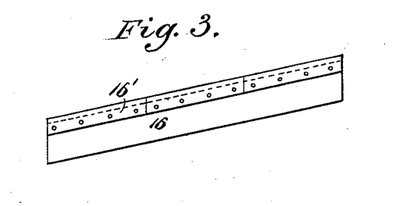
Fig. 3 represents a simple form of plow share.

Fig. 3 of the drawings is inserted simply for purposes of comparison, and represents in face view a simple form of slanting share 16, made of a metal plate having attached steel cutters forming the edge 16' inclined at desirable angle of about twelve degrees. When the preferred number of three shares is to be used on the drum, this form of share with a continuous or unstepped inclined edge will not allow uninterrupted cutting of molds during the entire rotation of the share drum, or in other words, one share will not begin to cut before the preceding share had ceased cutting. I have found, however, that by making each share with a stepped cutting edge, I can practically increase the circumferential width of the share to an extent securing this uninterrupted cutting of molds during the entire rotation of the drum, and without altering the desirable incline of the cutting edges of the shares. This edge incline should be a moderate one giving the shares an easy shearing cut while not having tendency to throw or deposit the cut molds too far endwise, to assure cutting, lifting and deposit of the molds with the least expenditure of power.

Figure 4:
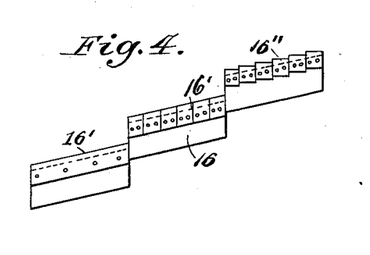
Figs. 4 and 5 show preferred forms of shares having stepped cutting edges.
Figure 5:
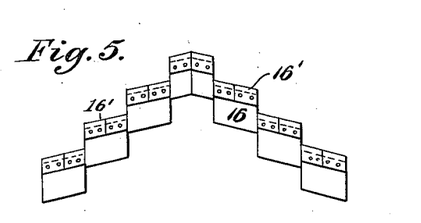

Preferred constructions of drum shares having stepped cutting edges are shown in Figs. 4 and 5 of the drawings. Fig. 4 shows a share made in three stepped sections one of which has cutting edge 16'' made up chiefly of a series of smaller steel plates each having its edge parallel to the drum shaft but together taking a desirable angle of about twelve degrees substantially like the other two sections of the share. Fig. 5 illustrates how each share may be made up of a series of plates stepped rearward each way from a central line, but each section of this share also has a cutting edge set at about the same angle of twelve degrees. This style of share practically prevents endwise throw or thrust of the molds cut by it, and therefore is preferred in practice. I show this preferred style of share on the drum in Fig. 2 of the drawings, which also illustrates how the shares 16 are held to the spiders 17, so closely end to end that the shares will cut molds for a continuous width equaling the entire distance between the outer ends of the outside shares, whereby no part of the ground within these limits will be left uncut in the path of the drum, while at the same time one share will begin its downward cut before the preceding share finishes its cut, thereby causing a comparatively uniform resistance of the share drum in the ground for its entire circumferential cutting surface or edge and avoiding shocks to the power transmitting mechanism which rotates the drum.

Another feature of construction of the drum having shares provided with cutting edges inclined at an angle not exceeding an approximate of thirty degrees, consists in giving the shares an inward curve from edge to heel which not only gives the rotating shares heel-clearance to accommodate the advancing movement of the plow apparatus, but materially assists in loosening the molds from the ground and in inverting them prior to their discharge rearward from the shares.

I have provided stripper devices or mechanism to positively drop the cut molds from the drum shares at the rear side of the drum and as soon as possible after the shares raise the molds from the ground. This immediate dropping of the molds assures their deposit regularly in inverted condition and also prevents carrying of molds cut from sticky or clay-like soil upward by the shares and over at the top of the drum and therefore largely economizes the driving power, while preventing the fall of the molds in front of the drum which if permitted would seriously interfere with or entirely prevent the proper cutting of molds.

It was to provide for the use of a stripper device near the ground and at the rear side of a share drum which cuts molds downwardly from the ground surface while rotating in the same direction as the running or traction wheels of the plow apparatus, that I have considered it best to use a non-rotating shaft on which the drum rotates, in order to allow the relatively stationary strippers to be fixed to the shaft within the drum. In fact I am not aware that a stripper device has before been used within the drum and a little above the ground, in a plow having a share drum rotating in like direction with the running wheels. With a share drum rotating in the reverse direction and cutting molds upwardly from the ground, a stationary stripper device if arranged near the ground at the front of the drum or where the shares ascend, would prevent raising of cut molds over the drum to the rear where they should be deposited to be out of the way of the cutting, and if such stripper were arranged near the ground in rear of the drum and where the shares descend in rotation, the stripper would prevent proper deposit of the molds.

Figure 1:
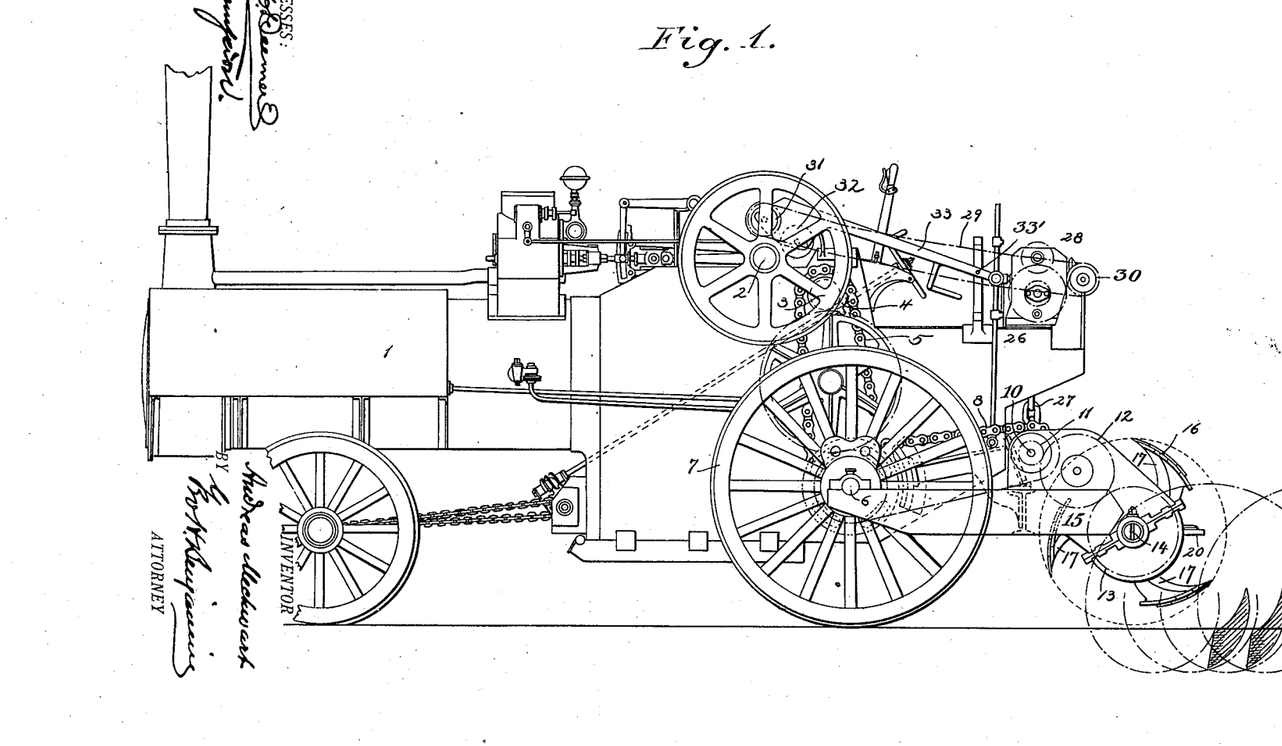
Figure 1 is a side view of the rotary plow.
Figure 2:
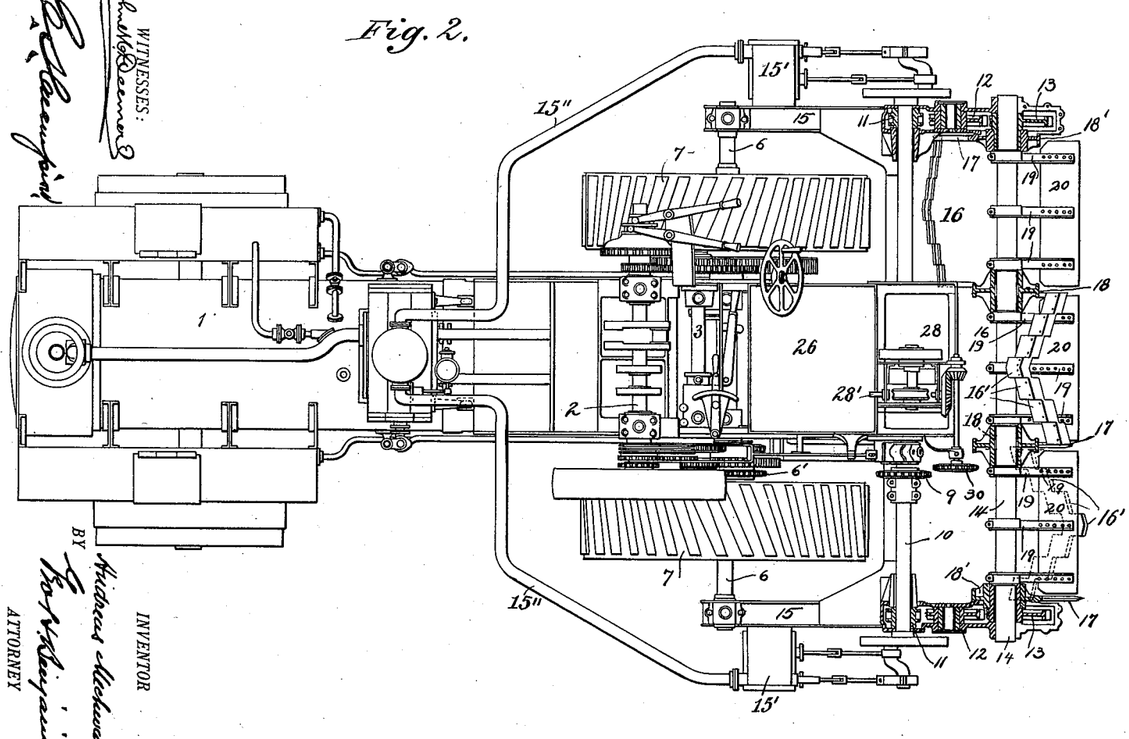
Fig. 2 is a plan view thereof, partly in horizontal section.

Figs. 1 and 2 of the drawings show one form of my stripper device which consists of a plate 20 fixed to arms 19, which are themselves fixed to the non-rotating shaft 14 of the share drum. In this construction the heels of the rotating shares 16 just clear the outer edges of the relatively stationary strippers 20.

Figure 6:
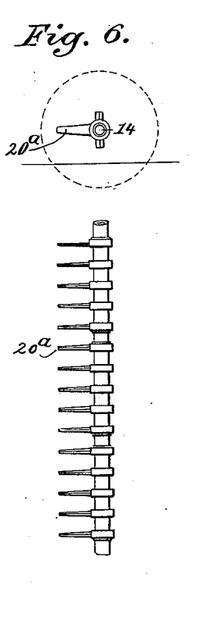
Figs. 6, 7, 8 and 9 show different variations of the strippers for the plow shares, the end views in Figs. 6 and 7 being taken from the opposite end of the share drum to that shown in Figs. 8 and 9, and Figs. 10 to 13, inclusive, illustrate various adaptations of a pilot or gage wheel for regulating the depth of cutting of the share drum.

Fig. 6 illustrates how I may fix a number of knives 20ª to the shaft 14, and have these knives project rearward in the same relation as shown for the plates 20. These knives may be used alone and will transversely subdivide the molds as they strip them from the drum shares, or the knives may be used in connection with the plates 20, if desired.

Figure 7:
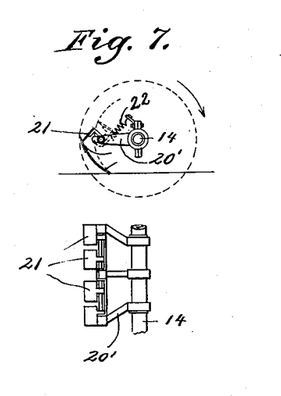

In order to prevent clogging of the drum and promote clean cutting of the shares, it is desirable to have a stripper device act as closely as possible to the entire inner curved face of each share from its cutting edge to heel. To assure this action I have made further improvement which consists in providing the relatively stationary stripper device with an extensible or movable outer part, which automatically conforms to the curved inner faces of the shares, to strip the molds cleanly or entirely therefrom. This movable outer part of the stripper device, after the heel of one share passes by it, may be retracted to its outermost position to act directly next the cutting edge of the following share, by either springs or weights, springs being preferable. Fig. 7 shows such movable stripper plates 21, which are pivoted to the outer ends of arms 20' fastened to the non-rotating share drum shaft 14, and provided with springs 22, which carry their working edges back from the position shown in dotted lines, after the heel of each share passes by them, to the position shown in full lines to begin acting next the cutting edge of the following share.

Figure 9:
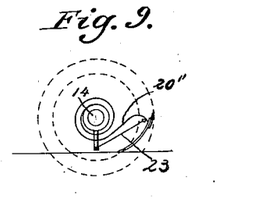

Fig. 9 shows how one or more coiled springs 20'' may be fastened at one end to the drum shaft 14, and so that the outer edge of the spring itself forms the stripper device and is held in proper relation to first act on the shares next their cutting edges by one or more tie chains 23, which permits the stripping edge of the spring to move over the entire inner curved face of each share.

Figure 8:
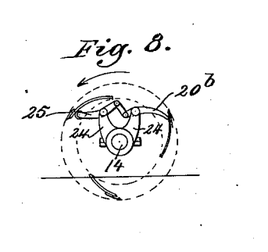

I have also made a further improvement which consists in combining with a non-rotating but adjustable stripper device, a means of operating said device by one share of the drum to cause the stripper to conform to the inner curved face of another share thereof to discharge the cut molds therefrom. A preferred embodiment of this improvement is shown in Fig. 8 of the drawings, wherein the stripper device 20ᵇ is pivoted to the end of a fixed arm 24 on the drum shaft 14, and a lever 25, preferably carrying one or more antifriction rollers at its outer end, is pivoted to another fixed arm 24 on the drum shaft, and is connected by a link with the inner end of the stripper 20ᵇ. Any suitable spring or weight may be used to throw both parts 20ᵇ, 25 to outermost positions. The inner clean curved face of the share last stripped strikes the lever 25 or its friction rollers, while the outer end of the stripper 20ᵇ is next the cutting edge of the next following share which has already cut and raised a mold from the ground, and as the drum continues to rotate, the curved inner face of the preceding share actuates the lever 25 and causes the stripper 20ᵇ to conform closely to the entire inner curved face of the rising share and cleanly strip the raised mold therefrom; and this share will in turn act on the lever 25, and so on, every successive share being cleanly stripped by the device 20ᵇ, actuated by the contact of the preceding share with the lever.

Another important feature of my invention, when considered in connection with the rotation of the share drum in like direction with the running wheels and to cut molds downward from the ground surface, consists in making the share drum broad enough, or to so adjust it laterally, that it will plow the ground for a width covering the path or track of at least one of the running or traction wheels 7.

In Fig. 2 of the drawings, the drum is broad enough to cut molds for a width covering the path of both wheels 7, 7, but should the share drum of a lighter machine be made much narrower or shorter, it should be laterally disposed to plow over the path of at least one of the wheels. When the drum cuts over the path of both wheels, new strips can be plowed along an already plowed part of the ground to either the right or left hand side, without requiring either of the traction wheels to run on the already plowed ground, but when the drum cuts over the path of but one wheel, a new strip can be plowed only on one side next an already plowed strip while keeping both wheels off the plowed ground.

It is important that the drum should be capable of plowing the entire ground without running the heavy traction wheels on the plowed land, because if one of the wheels runs on the plowed ground it will not only ruin the plowing in its track, but it will sink deeply and throw the entire apparatus out of lateral level and cause the share drum to plow much more deeply at one end than at its other end, thereby producing unevenly deep and incorrect work.

In Fig. 1 of the drawings, the theoretical position of the regularly deposited molds is shown, but in practice the tops of the molds would break off. The molds may also be broken to any desired greater extent by increasing the inward curve or bend of the drum shares from edge to heel over that necessary to give heel-clearance to the shares and invert the molds during rotation of the advancing drum.

In many instances it may be desirable or necessary to mount auxiliary motors 15′ upon the plow apparatus, and preferably upon the suspension frame 15, and connect these motors by induction pipes 15″ with the steam boiler or other compressed fluid reservoir of the traction engine; or these auxiliary motors may be electric motors. Said auxiliary motors are connected preferably by cranks with the intermediate shaft 10, and assist in rotating it at a speed synchronous with that the shaft receives directly from the driving belt 8 and wheels 6′, 9 of the traction engine gearing. By mounting the auxiliary motors directly on the suspension frame and as closely as possible to the pivot shaft 6 of the frame, the movement of the motors during vertical movement or vibration of the frame is so slight that I am able to use durable metallic pipes 15″ for the steam or compressed air, while having every advantage of direct and permanent connection between the pistons of the motors 15′, and the driving shaft 10 from which the share drum is rotated.

The stand or platform 26 for the plowman or attendant is made especially strong in order to safely sustain gearing for raising or lowering the suspension frame 15 and its share drum. A chain 27 connected to a crossbar of the frame extends upward to a winch gearing 28 on the stand 26. This gearing has a shaft 28′ adapted to receive a crank by which the winch may be operated by hand to wind and unwind the chain for raising or lowering the suspension frame. This gearing is also adapted for operation by power derived from the motor shaft 2, in order to adjust the frame 15 more easily. A chain-belt 29 runs from a sprocket wheel 30 on a bevel gearing shaft of the winch 28 to a sprocket wheel on a shaft which carries a friction wheel 31. This wheel 31 and another friction wheel 32 are both journaled to a vibratory frame or lever 33, which is fulcrumed at 33′ to a standard on the carriage, and may be adjusted to bring either one of the wheels 31 or 32 into contact with a continuously running friction wheel on the shaft 2 of the motor mechanism. The shafts of the wheels 31, 32 are geared to each other by toothed wheels which compel simultaneous rotation of the wheels but in different directions. Hence the chain 29 will be operated to the right or left hand accordingly as the friction wheel 31 or 32 is brought in contact with the friction wheel on the motor shaft, thus raising or lowering the suspension frame and share drum at the will of the plowman handling the lever 33.

Figure 10:
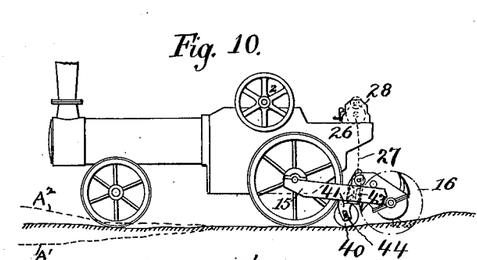

The unevenness of the ground influences the extent of penetration or working depth of the plow. This is illustrated in Fig. 10 of the drawings wherein the dotted lines A', A² indicate conditions of ground surface which would cause the share drum to work to a less and greater depth respectively.

A uniform depth of working is essential to any good plowing apparatus. If automatic devices are not provided to assure this operation by my machine, the plowman on the stand 26 would be required to constantly adjust the share drum vertically by manipulating the lever 33, to throw the drum raising and lowering gearing above described into operation to accommodate the uneven ground surface. This would require great skill and care on the part of the plowman and would also be tiresome work. Hence it is desirable to provide automatically operating devices to assure constant proper working depth of the plow. This may be done in a simple manner by journaling the shaft of a gage wheel 40 in vertically adjustable boxes 44 supported in slotted brackets 41 fastened to cross-pieces 43 of the share drum suspension frame 15. This construction allows the gage wheel to be set at any required height, so as to run on the unplowed ground directly at the front and center of the share drum and uniformly gage the depth of cutting of the shares. When this gage wheel is used, the suspension chain 27 will be slackened off to permit the entire weight of the drum and outer parts of its suspension frame 15 to rest on the gage wheel 40, which is made broad enough to prevent it sinking into the ground. When the share drum is purposely lifted from the ground the gage wheel is lifted with it. I prefer, however, to automatically regulate the working depth of the drum shares by the aid of directly applied power acting conjointly with one or more ground gage wheels, or controlled directly by lever mechanism in reach of the plowman.

Figure 11:
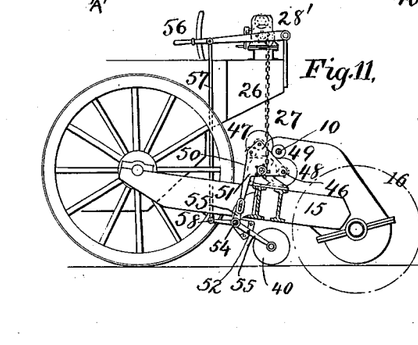
Figure 12:
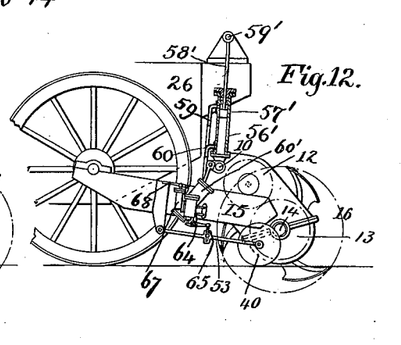
Figure 13:
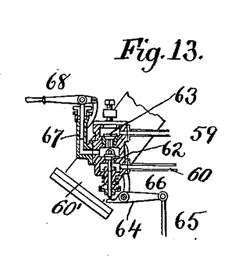

Fig. 11 of the drawings illustrates both adaptations, while Fig. 12 shows an automatic adjustment for cutting depth by the agency of a ground wheel the movements of which control the valves of a hydraulic device by which the share drum is adjusted. Fig. 13 shows details of the valves of said hydraulic device.

I will first describe the construction shown in Fig. 11, as follows: The chain 27, hanging from the winch 28, is here fastened to and laid around a chain wheel or drum 46, the shaft of which is journaled in bearings on the share drum suspension frame 15, and is provided with a friction wheel. An oscillatory frame 50 having pendent lever arms 51 is journaled on the shaft of the chain wheel 46, and carries two friction wheels 47, 48, both normally in contact with the friction wheel on the chain wheel or drum 46. Either of these wheels 47, 48 may be brought in contact with the continuously running friction wheel 49 on the intermediate driving shaft 10 of the share drum mechanism. On the frame 15 is also journaled a shaft 54, to which are fixed rearwardly projecting arms 53, to which the ground gage wheel 40 is journaled. On the shaft 54 are also fixed elbow levers 55, the upper arms of which have suitable pin and slot connections with the lever arms 51 of the oscillatory friction wheel frame 50. The lower rearward portions of the elbow levers have series of holes adapted to receive pins 52 passed through the gage wheel arms 53, to allow different initial adjustments of the gage wheel relatively to the share drum, to control the working of the drum to any desired predetermined maximum depth. A hand lever 56, in reach of the plowman has a pendent push-rod 57 which connects with an arm 58 fixed to the shaft 54, and allows the friction wheel frame 50 to be rocked by hand to cause lifting of the share drum, as hereinafter explained.

Should the share drum be plowing too deeply, the gage wheel 40 is relatively raised and rocks the levers 55 and frame 50, so as to throw the friction wheel 47 against the running friction wheel 49, thereby winding the chain 27 on the wheel 46, and raising the share drum until it again plows at proper depth. If the drum does not plow deeply enough, the gage wheel 40 will rock the parts 55, 50, so as to swing the other friction wheel 48 to the wheel 49, and cause unwinding of the chain 27 from the wheel 46, thereby letting down the drum to proper working depth. To cause mechanical raising of the share drum at any time desired, the plowman will simply press down on the lever 56, which will lower the arm 58 and rock the parts 55, 50, to engage the friction wheel 47 with the wheel 49 and thereby wind the chain 27 on the wheel 46, and lift the suspension frame 15 to carry the share drum and gage wheel to any desired height above the ground surface.

In Fig. 12 of the drawings, the hydraulic cylinder 56' has a rocking connection with the share drum suspension frame 15, and preferably with the intermediate driving shaft 10. The piston 57' is fixed to a rod 58', which has a rocking connection at 59' with a shaft or pivot sustained on the plowman's platform 26. The fluid pressure tube 59 opens to the cylinder above the piston 57', and the suction tube 60 opens to the cylinder below the piston. If water is pumped into the cylinder through the pipe 59, the cylinder will be raised and will raise the suspension frame 15 and share drum 16 with it, and if the water is admitted through the pipes 60 below the piston, the share drum will be lowered. To obtain the pressure, a pump 60' is used. The pump valves are shown in vertical section in Fig. 13 of the drawings. The pump piston may be actuated by a crank on the driving shaft 10, as shown in Fig. 12, but it may also be operated from the shaft of the intermediate wheel 12 of the share drum driving gearing. This pump may have either single or double action and has a suction valve 62 and pressure valve 63. The pump piston is constantly actuated but the pump is stopped by opening of the suction valve. In this case the share drum will remain at a certain height. The letting down of the plow is effected by raising the pressure valve when the suction valve is open. In this case the pressure water entering through the tube 59 passes freely by the open pressure valve 63 and suction valve 62 and *via* the tube 60 to the cylinder 56' below the piston 57'.

The capacity of the suspension frame to yield or rise automatically over an obstruction is not interfered with by either of the depth regulating mechanisms shown in Figs. 11 or 12. In the former, the suspension chain 27 would simply be slackened or doubled up as the suspension frame and drum were raised while passing over an obstruction; and with the hydraulic device, the share drum in rising over an obstruction would carry the cylinder 56' upward and cause the piston to enter it farther and form a vacuum in the cylinder above the piston. This causes the valve to open and fill the cylinder above the piston with water, thereby preventing shock when the share drum again falls to proper working position after passing the obstruction.

The valves of the hydraulic device are controlled directly and automatically, and substantially in accordance with the same general operative principle as with the friction wheel mechanism shown in Fig. 11, which is to cause automatic mechanical regulation of the working depth of the plow by or from a gage wheel or wheels running on the ground.

The hydraulic pump valves are actuated from the gage wheel 40, the arms 53 of which are connected by a rod 65 with the long arm of a lever 64, the short arm of which is adapted to press upward the stem of the suction valve 62, which after moving upward sufficiently to open, is adapted by further movement to also open the pressure valve 63 above it.

In operation, if the gage wheel 40 descends relatively to the suspension frame 15 of the share drum and the drum is not cutting deeply enough, the gage wheel arms 53 draw down the rod 65, and pull the lever 64, to lift the suction valve, thereby shutting off the pump. If the lifting of the suction valve is continued, said valve then opens the pressure valve also, and the share drum then descends to proper working depth. Should the plow work too deeply in the ground, the gage wheel arms 53 will raise the rod 65, and the lever 64 will release the valves and the pump is operated until the plow is raised to proper working depth.

To raise the plow in case the prime motor and the pump driving means are not in operation, I have provided a hand pump 67, the cylinder of which is in communication with the space between the suction and pressure valves of the main pump. By working the pump handle 68 the main pump valves are utilized while raising the plow by hand-pump action, and without requiring separate or independent valves for the hand pump.

I may use one broad gage wheel 40, working directly behind and at the center of the share drum, as shown in Fig. 11, or I may use two narrower gage wheels 40, one running on the ground at each end of the drum and as indicated in Fig. 12 of the drawings.

In conclusion, I state that I have closely studied many earlier rotary plowing and cultivating apparatus or machines, particularly those shown in United States Patents Nos. 32,600, 40,717, 44,077, 100,183, 144,820, 174,275, 234,882, 243,843, 300,413, 309,337, 348,401, 349,807 and 396,170. I do not claim as my invention anything shown, described or claimed in the aforesaid prior patents. These prior patented constructions may here and there show a part or describe a general mode of operation in some respects similar to that shown and described herein by me, but there are many new constructions and novel combinations and sub-combinations of parts or elements in my apparatus, indicated by the appended claims, which are not disclosed by prior constructions and which I deem essential to a successful or thoroughly practical plowing apparatus.

Having thus described my invention, I claim as new and desire to secure by Letters Patent—

1. A rotary plow having a revoluble drum carrying knife-like shares which have shearing edges inclined at moderate pitch, not exceeding thirty degrees, and adapted to cut and lift and subsequently deposit molds.

2. A rotary plow having a revoluble drum carrying knife-like shares which cut the ground downwardly from the top and have shearing edges inclined at moderate pitch, not exceeding thirty degrees, and adapted to cut and lift molds and deposit them rearward.

3. A rotary plow having a revoluble drum carrying a series of knife-like shares arranged circumferentially around the drum and acting successively and with a continuous circumferential cut, said shares having shearing edges inclined at moderate pitch, not exceeding thirty degrees.

4. A rotary plow having a revoluble drum carrying knife-like shares, each share having a stepped edge formed of a series of cutting edges disposed for successive operation and inclined at moderate pitch, not exceeding thirty degrees.

5. A rotary plow having a revoluble drum carrying knife-like shares, each share having a cutting edge formed of a series of stepped edges extending rearward each way from a central or intermediate point toward both ends, each stepped edge portion being inclined at moderate pitch, not exceeding thirty degrees.

6. A rotary plow having a revoluble drum carrying knife-like shares which have shearing edges inclined at moderate pitch, not exceeding thirty degrees, said shares also being curved inwardly from edge to heel to accommodate the advancing movement and drop the cut molds rearwardly in inverted condition.

7. A rotary plow having a revoluble drum carrying a series of knife-like shares, each share formed with a series of cutting edges disposed for successive operation and inclined at moderate pitch not exceeding thirty degrees, said shares also being curved inwardly from stepped edge to heel to accommodate the advancing movement and drop the cut molds rearwardly in inverted condition.

8. A rotary plow having a revoluble drum carrying knife-like shares, each share having a cutting edge formed of a series of stepped edges extending rearward each way from a central or intermediate point toward both ends, each stepped edge portion being inclined at moderate pitch not exceeding thirty degrees, said shares also being curved inwardly from edges to heel to accommodate the advancing movement and drop the cut molds directly rearward in inverted condition.

9. A rotary plow having a revoluble drum carrying knife-like shares disposed endwise to cut and lift molds from the ground for a space equaling in width the entire distance between the outer ends of the outside shares, said shares having cutting edges inclined at moderate pitch, not exceeding thirty degrees.

10. A rotary plow having a revoluble drum carrying knife-like shares disposed endwise to cut and lift molds from the ground for a space equaling in width the entire distance between the outer ends of the outside shares, said shares having cutting edges inclined at moderate pitch not exceeding thirty degrees and also being curved inwardly from edge to heel to accommodate the advancing movement and lift and drop the cut molds rearwardly in inverted condition.

11. A rotary plow having a revoluble drum carrying knife-like shares disposed endwise to cut and lift molds from the ground for a space equaling in width the entire distance between the outer ends of the outside shares, said shares being each formed with a series of stepped cutting edges disposed for successive operation and inclined at moderate pitch not exceeding thirty degrees.

12. A rotary plow having a revoluble drum carrying knife-like shares disposed endwise to cut and lift molds from the ground for a space equaling in width the entire distance between the outer ends of the outside shares, each share being formed with a series of stepped cutting edges disposed for successive operation and inclined at moderate pitch not exceeding thirty degrees, said shares also being curved inwardly from edges to heel to accommodate the advancing movement and drop the cut molds rearwardly in inverted condition.

13. A rotary plow, comprising a vehicle, a suspension frame pivoted thereto and extending rearward, a revoluble drum mounted on said frame and carrying knife-like shares having cutting edges inclined at moderate pitch not exceeding thirty degrees, and driving gearing on the vehicle rotating the drum.

14. A rotary plow, comprising a vehicle, a suspension frame pivoted thereto and extending rearward, a revoluble drum mounted on said frame and carrying knife-like shares having cutting edges inclined at moderate pitch not exceeding thirty degrees, and driving gearing on the vehicle rotating the drum in like direction with the vehicle wheels.

15. A rotary plow, comprising a vehicle, a suspension frame pivoted thereto and extending rearward, a revoluble drum mounted on said frame and carrying knife-like shares having cutting edges inclined at moderate pitch not exceeding thirty degrees, said shares also being curved inward from edge to heel to accommodate the advancing movement and drop the cut molds rearwardly in inverted condition, and driving gearing on the vehicle rotating the drum in like direction with the vehicle wheels.

16. A rotary plow, comprising a vehicle, a suspension frame pivoted thereto and extending rearward, a revoluble drum mounted on said frame and carrying a series of knife-like shares having cutting edges inclined at moderate pitch not exceeding thirty degrees, said shares being disposed endwise to cut and lift molds from the ground for a space equaling in width the entire distance between the outer ends of the outside shares, and driving gearing on the vehicle rotating the drum.

17. A rotary plow, comprising a vehicle, a suspension frame pivoted thereto, a revoluble drum mounted on said frame and carrying knife-like shares having cutting edges inclined at moderate pitch not exceeding thirty degrees, a driving shaft or means on the vehicle, and gearing interposed between the driving means and the share drum, said driving shaft or means having a rotative speed faster than that of the share drum.

18. A rotary plow, comprising a vehicle, a suspension frame pivoted thereto, a revoluble drum mounted on said frame and carrying knife-like shares having cutting edges inclined at moderate pitch not exceeding thirty degrees, a driving shaft or means on the vehicle, and gearing interposed between the driving means and the share drum and rotating the drum in like direction with the vehicle wheels, said driving shaft or means having a rotative speed faster than that of the share drum.

19. A rotary plow, comprising a vehicle, a suspension frame pivoted thereto, a revoluble drum mounted on said frame and carrying knife-like shares arranged in different circumferential positions around the drum for successive but continuous cutting of molds, said shares having cutting edges inclined at moderate pitch not exceeding thirty degrees, a driving shaft or means on the vehicle, and gearing interposed between the driving means and the share drum, said driving shaft or means having a rotative speed faster than that of the share drum.

20. A rotary plow, comprising a vehicle, a suspension frame pivoted thereto, a revoluble drum mounted on said frame and carrying knife-like shares arranged in different circumferential positions around the drum for successive but continuous cutting of molds, said shares having cutting edges inclined at moderate pitch not exceeding thirty degrees, a driving shaft or means on the vehicle, and gearing interposed between the driving means and the share drum and rotating the drum in like direction with the vehicle wheels, said driving shaft or means having a rotative speed faster than that of the share drum.

21. A rotary plow, comprising a vehicle, a suspension frame pivoted thereto, a revoluble drum mounted on said frame and carrying knife-like shares arranged in different circumferential positions around the drum and disposed endwise for successive but continuous cutting of molds for a space equaling in width the entire distance between the outer ends of the outside shares, said shares having cutting edges inclined at moderate pitch not exceeding thirty degrees, a driving shaft or means on the vehicle, and gearing interposed between the driving means and the share drum, said driving shaft or means having a rotative speed faster than that of the share drum.

22. A rotary plow, comprising a vehicle, a suspension frame pivoted thereto, a revoluble drum mounted on said frame and carrying knife-like shares having cutting edges inclined at moderate pitch not exceeding thirty degrees, said shares also being curved inwardly from edge to heel, a driving shaft or means on the vehicle, and gearing interposed between said shaft and the share drum and rotating the drum in like direction with the vehicle wheels, said driving shaft or means having a rotative speed faster than that of the share drum.

23. A rotary plow, comprising a wheeled vehicle and a revoluble drum thereon provided with knife-like shares having cutting edges inclined at moderate pitch not exceeding thirty degrees and cutting molds from the ground to a width covering the path of at least one of the vehicle traction wheels.

24. A rotary plow, comprising a wheeled vehicle and a revoluble drum thereon rotating in like direction with the vehicle wheels and provided with knife-like shares having cutting edges inclined at moderate pitch not exceeding thirty degrees and cutting molds downwardly from the ground to a width covering the path of at least one of the vehicle traction wheels.

25. A rotary plow, comprising a wheeled vehicle, a revoluble drum thereon provided with a series of knife-like shares arranged in different circumferential positions around the drum for successive but continuous cutting of molds for a space equaling in width the entire distance between the outer ends of the outside shares and covering the path of at least one of the vehicle traction wheels, said shares having cutting edges inclined at moderate pitch not exceeding thirty degrees.

26. A rotary plow, comprising a wheeled vehicle, a suspension frame pivoted thereto, a revoluble drum mounted on said frame and carrying knife-like shares having cutting edges inclined at moderate pitch not exceeding thirty degrees and cutting molds from the ground to a width covering the path of at least one of the vehicle traction wheels, a driving shaft or means on the vehicle, and gearing interposed between said driving means and the share drum, said driving means having a rotative speed faster than that of the share drum.

27. A rotary plow, comprising a wheeled vehicle, a suspension frame pivoted thereto, a revoluble drum mounted on said frame and carrying knife-like shares having cutting edges inclined at moderate pitch not exceeding thirty degrees and cutting molds from the ground to a width covering the path of at least one of the vehicle traction wheels, a driving shaft or means on the vehicle, and gearing interposed between said shaft and the share drum and rotating the drum in like direction with the vehicle wheels, said driving means having a rotative speed faster than that of the share drum.

28. A rotary plow, comprising a wheeled vehicle, a suspension frame pivoted thereto, a revoluble drum mounted on said frame and carrying knife-like shares having cutting edges inclined at moderate pitch not exceeding thirty degrees, said shares also being curved inwardly from edge to heel and cutting molds from the ground to a width covering the path of at least one of the vehicle traction wheels, and depositing the molds rearward in inverted condition, a driving shaft or means on the vehicle and gearing interposed between said shaft and the share drum and rotating the drum in like direction with the vehicle wheels, said driving means having a rotative speed faster than that of the share drum.

29. A rotary plow, comprising a wheeled vehicle, a suspension frame pivoted thereto, a revoluble drum mounted on said frame and carrying a series of knife-like shares arranged in different circumferential positions around the drum for successive but continuous cutting of molds from the ground to a width covering the path of at least one of the vehicle traction wheels, said shares having cutting edges inclined at moderate pitch not exceeding thirty degrees and also being curved inwardly from edge to heel, a driving shaft or means on the vehicle, and gearing interposed between said shaft and the share drum and rotating the drum in like direction with the vehicle wheels, the driving shaft or means having a rotative speed faster than that of the share drum.

30. A rotary plow, comprising a wheeled vehicle, a suspension frame pivoted thereto, a revoluble drum mounted on said frame and carrying knife-like shares disposed endwise to cut and lift molds from the ground for a space equaling in width the entire distance between the outer ends of the outside shares, and to a width covering the path of at least one of the vehicle traction wheels, said shares also being curved inwardly from edge to heel to accommodate the advancing movement and drop the molds rearwardly in inverted condition, said shares also having cutting edges inclined at moderate pitch not exceeding thirty degrees; a driving shaft or means on the vehicle, and gearing interposed between said shaft and the share drum and rotating the drum in like direction with the vehicle wheels, said driving shaft or means having a rotative speed faster than that of the share drum.

31. The share drum cutting molds downwardly from the ground surface, combined with a stripper common to all the shares and device discharging the molds therefrom.

32. The share drum cutting molds downwardly from the ground surface, combined with a stripper common to all the shares and device located within and at the rear side of the drum and discharging the molds from the drum shares.

33. A rotary plow having a revoluble drum carrying knife-like shares having cutting edges inclined at moderate pitch not exceeding thirty degrees, and a stripper device discharging the molds from the drum shares.

34. A rotary plow having a revoluble drum carrying knife-like shares having cutting edges inclined at moderate pitch not exceeding thirty degrees, said shares also being curved inwardly from edge to heel, and a stripper device discharging the molds from the drum shares.

35. A rotary plow having a revoluble drum carrying knife-like shares having cutting edges inclined at moderate pitch not exceeding thirty degrees and cutting molds downwardly from the ground surface, and a stripper device discharging the molds from the drum shares.

36. A rotary plow having a revoluble drum carrying a series of knife-like shares arranged circumferentially around the drum for successive but continuous cutting of molds downwardly from the ground surface, said shares having cutting edges inclined at moderate pitch not exceeding thirty degrees, and a stripper device discharging the molds from the drum shares.

37. The share drum revoluble on a non-rotating shaft, combined with a stripper device fixed to the shaft and discharging the molds from the drum shares.

38. The share drum revoluble on a non-rotating shaft and a stripper device fixed to the shaft and projecting toward the rear and discharging the molds from the drum shares shortly after the molds are lifted by the shares above the ground.

39. A rotary plow having a share drum revoluble on a non-rotating shaft and provided with a series of knife-like shares having cutting edges inclined at moderate pitch not exceeding thirty degrees, and a stripper device fixed to the shaft and discharging the molds from the drum shares.

40. A rotary plow having a share drum revoluble on a non-rotating shaft and provided with a series of knife-like shares having cutting edges inclined at moderate pitch not exceeding thirty degrees, said shares also being curved inwardly from edge to heel, and a stripper device discharging the molds from the drum shares.

41. A rotary plow having a share drum revoluble on a non-rotating shaft and provided with a series of knife-like shares having cutting edges inclined at moderate pitch not exceeding thirty degrees, said shares cutting molds downwardly from the ground surface and being curved inwardly from edge to heel to accommodate the advancing movement, and a stripper device fixed to the shaft and discharging the molds from the drum shares.

42. The share drum constructed with a non-rotating shaft, mediate and terminal hubs loosely mounted thereon and carrying spiders or frames extending to the periphery of the drum, knife-like shares held to said spiders or frames, and a stripper device held to the shaft within the shares and discharging the molds therefrom.

43. The share drum constructed with knife-like shares inwardly curved from edge to heel, combined with a non-rotating stripper device having extensible outer part conforming to the entire inner curved faces of the shares and stripping molds therefrom.

44. The share drum constructed with knife-like shares inwardly curved from edge to heel, combined with a non-rotating stripper device having extensible outer part conforming to the entire inner curved faces of the shares and stripping molds therefrom, and a retracting device automatically adjusting the extensible part of the stripper to begin acting next the cutting edge of each successive share of the drum.

45. The share drum constructed with knife-like shares inwardly curved from edge to heel, combined with a non-rotating adjustable stripper device, and means operated by one share of the drum and causing the stripper to conform to the inner curved face of another share thereof to discharge the cut molds therefrom.

46. A rotary plow having a share drum provided with knife-like shares curved inwardly from edge to heel, and revoluble on a relatively stationary shaft, combined with a non-rotating stripper device held to said shaft and having extensible outer part conforming to the entire inner curved faces of the shares and stripping the molds therefrom.

47. A rotary plow having a share drum provided with knife-like shares curved inwardly from edge to heel, and revoluble on a relatively stationary shaft, combined with a non-rotating stripper device held to said shaft, and means operated by one share of the drum and causing the stripper to conform to the inner curved face of another share thereof to discharge the molds therefrom.

48. In a rotary plow, the combination, with a vehicle and its traction wheel axle, of a suspension frame hung on said axle, a share drum on said frame, an intermediate driving shaft on the frame and rotated from a prime motor on the vehicle, gearing rotating the share drum from the intermediate shaft, a winch on the vehicle adapted for operation by either power mechanism or hand power, and a chain connecting the winch and the drum suspension frame.

49. In a rotary plow, the combination, with a vehicle, of a suspension frame pivoted thereto, a share drum on said frame, gearing rotating the drum from a prime motor on the vehicle, a winch on the vehicle, a chain suspending the drum frame from the winch, a friction wheel on the prime motor shaft, a lever fulcrumed on the vehicle and carrying two geared friction wheels each adapted to engage the prime motor friction wheel, and a belt connecting one of the geared friction wheels with the winch gearing.

50. In a rotary plow, the combination with a vehicle, of a suspension frame pivoted thereto, a share drum on said frame, a suspension device on the vehicle for the drum frame, an auxiliary motor device adapted to raise and lower the frame and drum, a gage wheel held yieldingly and to run on the ground near the drum, and connections from said wheel to the auxiliary motor device, substantially as described, whereby the working depth of the share drum is automatically regulated from the ground surface by the agency of the gage wheel controlling the auxiliary motor.

51. A rotary plow constructed with a vehicle, a suspension frame pivoted thereto, a share drum on said frame, a suspension device on the vehicle for the frame and drum, an auxiliary motor device adapted to raise and lower the frame and drum, a gage wheel held yieldingly and to run on the ground near the drum, connections from said wheel to the auxiliary motor device whereby the working depth of the share drum is automatically regulated from the ground surface by the agency of the gage wheel controlling the auxiliary motor, and means operative by hand power for controlling the operation of the auxiliary motor device to raise the share drum from the ground when the plow apparatus is at rest.

52. In a rotary plow, the combination, with a vehicle, of a suspension frame pivoted thereto, a share drum on said frame, a suspension device on the vehicle for the drum frame and comprising a chain laid around a wheel whose shaft carries a friction wheel, a lever frame having two friction wheels engaging the first named friction wheel, a driving shaft on the suspension frame, a friction wheel on said shaft to which either of the two lever frame friction wheels may be adjusted, a yielding ground gage wheel on the suspension frame, and connections from the gage wheel to the lever frame, substantially as described, whereby the working depth of the share drum is automatically regulated from the ground by the gage wheel adjusting the friction gearing on the lever frame relatively to the friction wheel on the driving shaft.

53. In a rotary plow, the combination, with a vehicle, of a suspension frame pivoted thereto, a share drum on said frame, a suspension device on the vehicle for the drum frame and comprising a chain laid around a wheel whose shaft carries a friction wheel, a lever frame having two friction wheels engaging the first named friction wheel, a driving shaft on the suspension frame, a friction wheel on said shaft to which either of the two lever frame friction wheels may be adjusted, a yielding ground gage wheel on the suspension frame, connections from the gage wheel to the lever frame, and a hand lever connection to the gage wheel, substantially as described, whereby the working depth of the share drum is automatically regulated from the ground by the gage wheel adjusting the friction wheels on the lever frame relatively to the friction wheel on the driving shaft, and whereby also the share drum may be raised by the friction gearing under control by the hand lever when the plow apparatus is at rest.

54. In a rotary plow, the combination with a vehicle, of a suspension frame pivoted thereto, a share drum on the frame, a prime motor on the vehicle rotating the share drum, and auxiliary motors on the suspension frame imparting rotative speed to the drum synchronous with that it derives from the prime motor.

55. In a rotary plow, the combination, with a vehicle and its traction wheel axle, of a suspension frame hung on said axle, a share drum on the frame, an intermediate driving shaft on this frame and rotated from a prime motor on the vehicle, gearing rotating the share drum from the intermediate shaft, and auxiliary motors on the suspension frame geared with the intermediate driving shaft and imparting to it and to the share drum rotative speeds synchronous with those the intermediate shaft and drum derive from the prime motor.

In testimony whereof I affix my signature in the presence of two witnesses.

ANDREAS MECHWART.

Witnesses:
GEORGE H. BENJAMIN,
HERMAN KUSTERER.